US005210919A

United States Patent [19]

Garman

[11] Patent Number: 5,210,919

[45] Date of Patent: May 18, 1993

[54] TOOL ASSEMBLY

[75] Inventor: James A. Garman, Eureka, Ill.

[73] Assignee: Caterpillar Inc., Peoria, Ill.

[21] Appl. No.: 874,147

[22] Filed: Apr. 27, 1992

[51] Int. Cl.[5] .................. B23P 19/04
[52] U.S. Cl. .................. 29/257; 29/267
[58] Field of Search .................. 269/249; 29/256, 257, 29/261, 262, 267

[56] References Cited

U.S. PATENT DOCUMENTS

| | | | |
|---|---|---|---|
| 1,422,390 | 7/1922 | Timm . | |
| 1,465,124 | 3/1923 | Gardner, Jr. . | |
| 1,821,283 | 9/1931 | Wisti | 29/257 |
| 1,886,874 | 11/1932 | Draim | 269/249 |
| 2,251,815 | 8/1941 | Abbratozzato | 269/249 |
| 2,519,157 | 8/1950 | Stacey | 29/257 |
| 2,607,110 | 8/1952 | Labounsky | 29/256 |
| 2,947,333 | 8/1960 | Johnson | 269/249 |
| 3,052,462 | 9/1962 | Butler | 269/249 |
| 3,139,787 | 7/1964 | Bochman et al. . | |
| 3,662,451 | 5/1972 | Wagner . | |
| 3,937,123 | 2/1976 | Matuschek et al. . | |
| 4,258,908 | 3/1981 | Goff et al. | 269/249 |
| 4,682,395 | 7/1987 | Klann . | |
| 4,724,608 | 2/1988 | Parrott . | |

FOREIGN PATENT DOCUMENTS

| | | | |
|---|---|---|---|
| 936328 | 7/1948 | France | 29/257 |

*Primary Examiner*—Robert C. Watson
*Attorney, Agent, or Firm*—Claude F. White

[57] ABSTRACT

A tool assembly for installing and removing horizontally oriented retaining pins in a mechanical joint between a bucket tooth and a tooth adapter includes first and second lever members and first and second threaded members which are threadably connected to the respective first and second lever members. The second lever member is pivotably connected to the first member. The tool assembly is adapted to be placed over a bucket tooth having a horizontally oriented retaining pin, with the second threaded member aligning with and contacting the retaining pin. As the first threaded member is rotated, a portion of the first lever member contacts the tooth and the second threaded member contacts the pin and forces the pin into the joint, or out of the joint. Conventionally, a large drift pin and hammer are used to remove retaining pins. However, these tools are not useable on horizontally oriented retaining pins. The subject tool assembly quickly and easily installs and removes retaining pins in a joint between a bucket tooth and a tooth adapter.

13 Claims, 3 Drawing Sheets

TOOL ASSEMBLY

TECHNICAL FIELD

This invention relates generally to a tool assembly and more particularly to a tool assembly which is useful in installing and removing a retaining pin in a mechanical joint between a plurality of elements.

BACKGROUND ART

As the size of earthmoving and construction vehicles increases, it becomes increasing difficult to assemble and dis-assemble various replaceable and serviceable components. Such components as replaceable bucket teeth on loader buckets and excavator buckets are normally releasably secured to the buckets or adapters by various types of retaining pins and locks. Large and cumbersome tools, such as drift pins and sledge hammers, are often used to install and remove the retaining pins from their locking engagement with the bucket teeth and adapters. Although these tools are rather primitive, they are effective in removing retaining pins which are oriented in a vertical direction through the bucket teeth. However, recent bucket tooth designs have incorporated retaining pins which are oriented in a horizontal direction through the teeth. Because the teeth are closely spaced along the bucket edge, it is extremely difficult, if not impossible, to remove such horizontally oriented retaining pins using conventional hammers and drift pins.

The present invention is directed to overcoming one or more of the problems as set forth above.

DISCLOSURE OF THE INVENTION

In one aspect of the present invention, a tool assembly for installing and removing a replaceable pin in a joint between a plurality of elements includes first and second lever members and first and second screw members threadably connected to the respective first and second lever members. The first lever member has first and second spaced walls which define a space therebetween and the second lever is positioned within this space and is pivotably connected to the first lever member.

Buckets for earthmoving and excavating vehicles often have replaceable teeth which are secured to the bucket edge and tooth adapters by retaining pins. Considerable force is required to install or remove these retaining pins. This task becomes especially difficult when the bucket teeth are retained by horizontally oriented pins. The close spacing of adjacent bucket teeth precludes the use of conventional types of tools for removing the horizontally oriented pins.

The subject tool assembly quickly and efficiently installs and removes retaining pins in horizontally oriented mechanical joints between bucket teeth and teeth holding adapters.

BEST MODE FOR CARRYING OUT THE INVENTION

Figure 1:
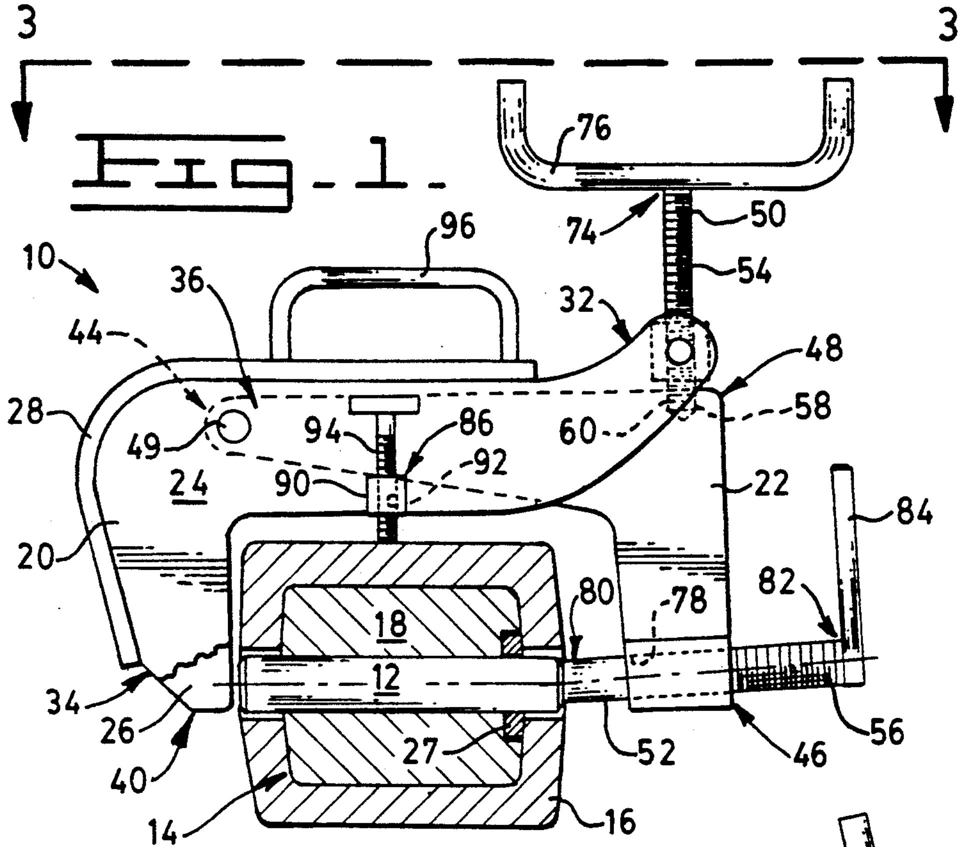
FIG. 1 is a diagrammatic front elevational view, partly in section, of the subject tool assembly in place on a bucket tooth prior to removal of a retaining pin.

Referring to the drawings, a tool assembly 10 for installing and removing a replaceable retaining pin 12 in a joint 14 between a plurality of elements 16 and 18, such as a bucket tooth 16 and a tooth adapter 18, includes first and second lever members 20,22 with the first lever member 20 having first and second spaced apart walls 24,26. The retaining pin 12 is normally held within the joint 14 by some type of clamping device, such as a spring element 27. The tool assembly 10 further includes a connecting plate 28 which connects the first and second walls together to form and maintain a predetermined space 30 therebetween. The first and second walls 24,26 are substantially similar with the first wall 24 having first and second end portions 32,34 and an intermediate portion 36. The second wall 26 has first and second end portions 38,40 and an intermediate portion 42. The second lever member 22 has first and second end portions 44,46 and an intermediate portion 48. The first end portion 44 of the second lever member 22 is adapted to be positioned with the space 30 and pivotably connected by a pivot pin 49 to the intermediate portions 36,42 of the first and second walls 24,26.

The tool assembly 10 further includes first and second screw members 50,52. The first screw member 50 has a threaded portion 54 which is threadably connected to the first lever member 20 at the first end portions 32,38 of the first and second walls 24,26. The second screw member 52 has a threaded portion 56 which is threadably connected to the second end portion 46 of the second lever member 22. The intermediate portion 48 of the second lever member 22 defines a socket 58, and the first screw member 50 has a first end portion 60 which is adapted to be pivotably positioned within the socket 58. The intermediate portion 48 of the second lever member 22 further defines first and second bores 62,64 which extend through the second lever member 22 and intersect the socket 58. First and second pins 66,68 are adapted to be positioned within a respective bore 62,64 to retain the first screw member 50 in the socket 58. The socket 58 is positioned substantially perpendicular to the second screw member 52.

A spacer threaded 70 is positioned within the space 30 and is connected to the first and second walls 24,26 at the respective first end portions 32,38. The spacer 70 has a first threaded throughbore 72, and the first screw member 50 is adapted to be threadably engaged with the first threaded throughbore 72. The first screw member 50 has a second end portion 74, and a first manipulating handle 76 is connected to the second end portion.

The second end portion 46 of the second lever member 22 defines a second threaded throughbore 78, and the second screw member 52 is adapted to be threadably engaged with the second threaded throughbore 78. The second screw member 52 has first and second end portions 80,82, and a second manipulating handle 84 is connected to the second end portion 82. The first end portion 80 is adapted to contact the retaining pin 12 during a pin removal or installation operation.

First and second positioning devices 86,88 are connected to a respective intermediate portion of the first and second walls 24,26. Each of the positioning devices 86,88 includes a block 90 which has a threaded throughbore 92. A threaded rod 94 is threadably engageable with the threaded throughbores 92, and is adapted to contact the bucket tooth 16. For manipulating the tool assembly 10, a third handle 96 is secured to the connecting plate 28.

INDUSTRIAL APPLICABILITY

With reference to the drawings, the subject tool assembly 10 is particularly suited for installing and removing a retaining pin 12 in a joint 14 between a bucket tooth 16 and a tooth adapter 18. For a removal operation, the tool assembly 10 is positioned onto a bucket tooth 10, as substantially shown in FIG. 1. The first and second positioning devices 86,88 are used to align the tool assembly. The second handle 84 is rotated to move the second screw member toward the retaining pin 12, until the first end portion 80 contacts the retaining pin 12. The second end portions 26,40 of the first and second walls 24,26 will contact the bucket tooth 16.

Figure 2:
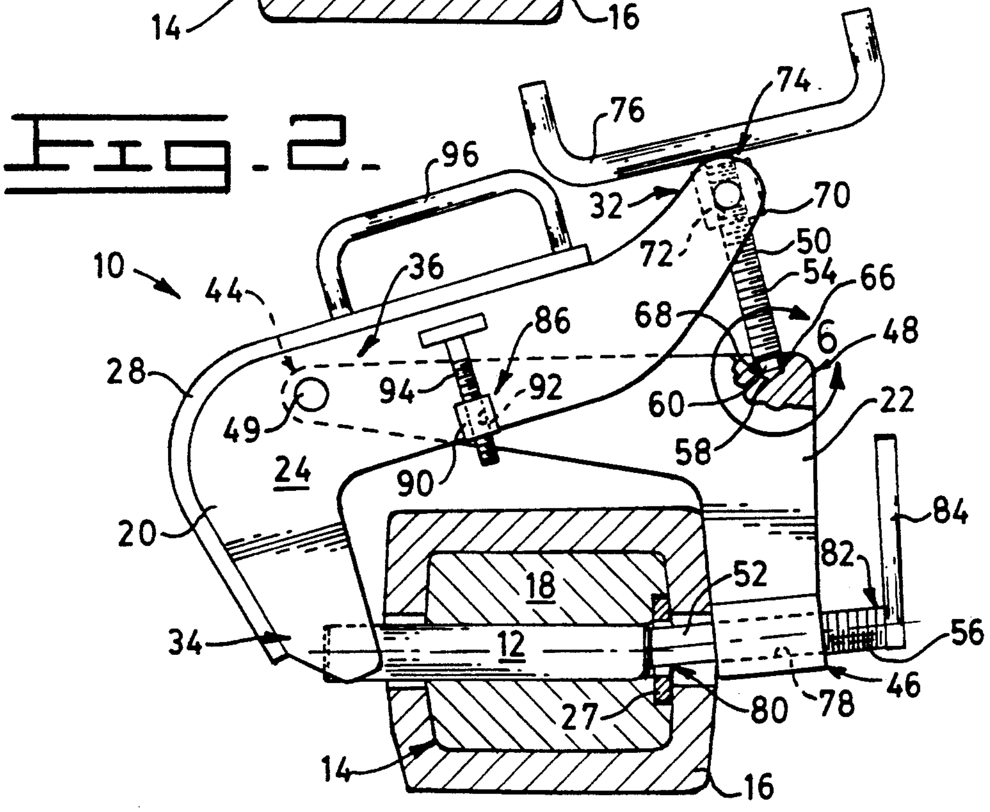
FIG. 2 is a diagrammatic front elevational view, partly in section, similar to FIG. 1 and with the retaining pin removed from holding engagement.
Figure 3:
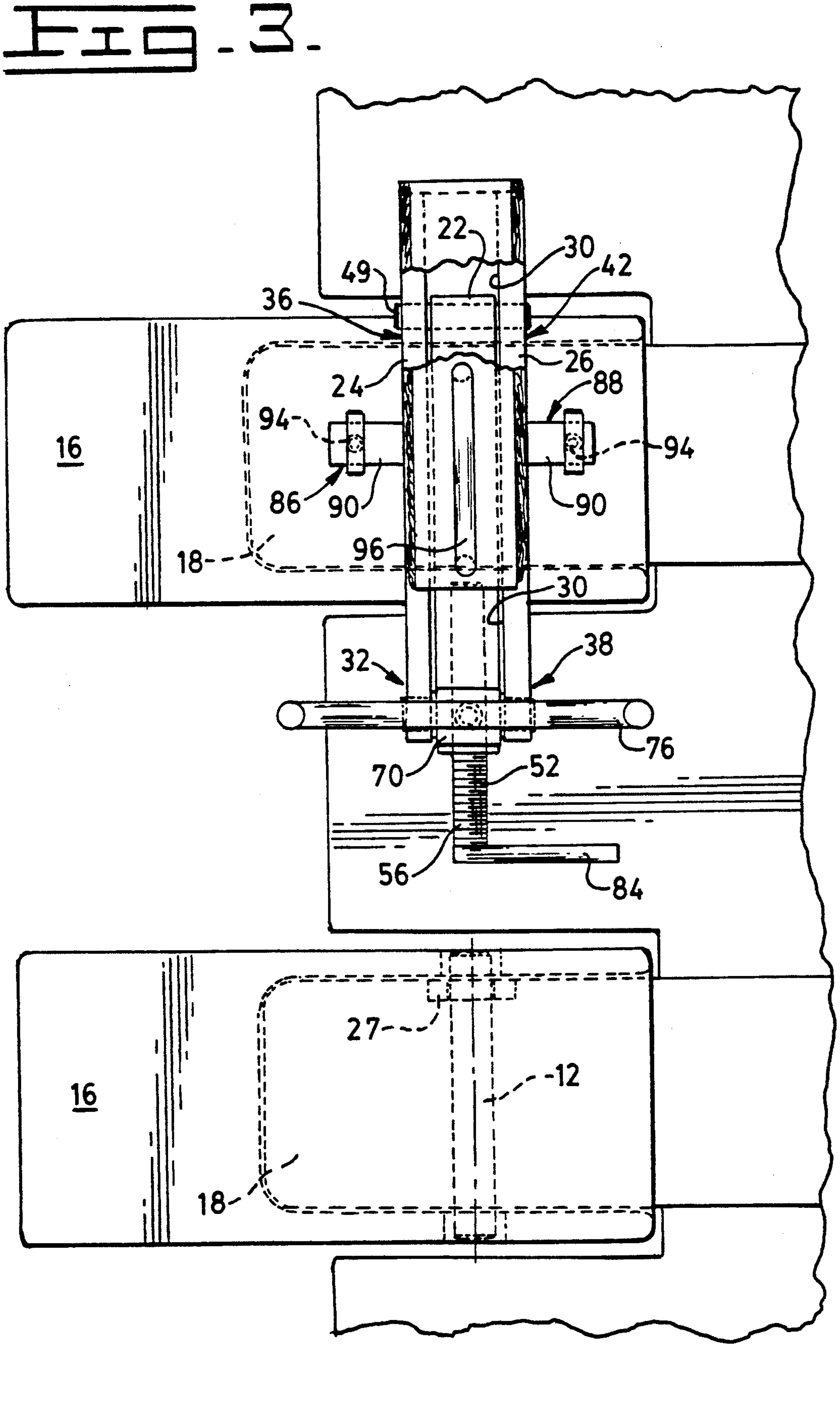
FIG. 3 is a plan view, with parts broken away, of the subject tool assembly, taken generally along the lines 3—3 of FIG. 1.
Figure 5:
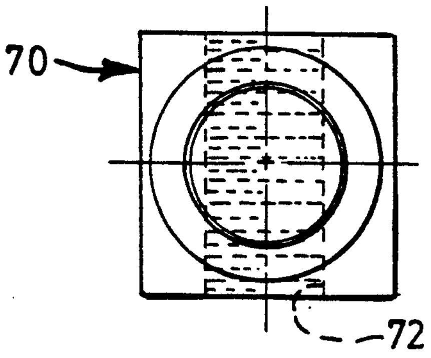
FIG. 5 is a diagrammatic end view of the block shown in FIG. 4, and taken generally along the lines 5—5 of FIG. 4.
Figure 4:
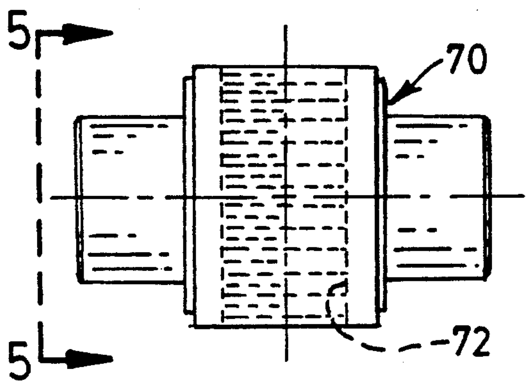
FIG. 4 is a diagrammatic front elevational view of a block used with the subject tool assembly.
Figure 6:
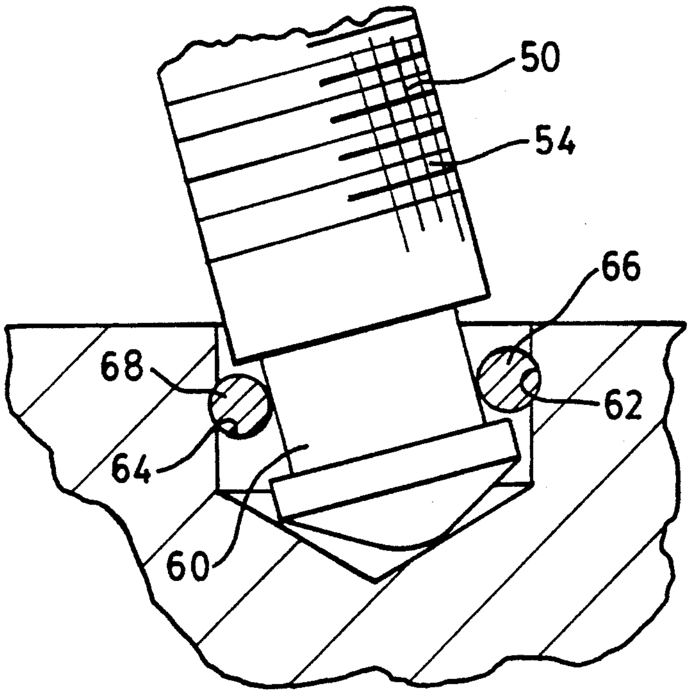
FIG. 6 is a diagrammatic sectional view, on an enlarged scale, of a portion of the subject tool assembly and taken generally from the area marked 6 in FIG. 2.

The first handle 76 is now rotated, either by hand or with the aid of a lever bar, to thread the first screw member 50 into the spacer 70. This forces the first and second lever members 20,22 to pivot about the pivot pin 49 and move the second screw member 52 inwardly of the bucket tooth 16. This forward motion of the second screw member 52 moves the retaining pin 12 laterally until pin 12 is released from engagement with the spring element 27, as substantially shown in FIG. 2.

The first handle 76 is then rotated to reverse the first screw member 50 until the first end portion 80 of the second screw member 52 is removed from within the bucket tooth 16. The tool assembly 10 can now be lifted from the bucket tooth 16 and re-positioned onto another bucket tooth 16, which needs the retaining pin 12 removed. After initial setting, the second screw member 52 is useable on all the teeth 16 without any re-adjustment. Once the spring element has been released from engagement with the pin 12, the pin can easily be removed from the joint 14.

An operation for installing a retaining pin 12 in a joint 14 is similar to that previously described. However, for such an installing operation, the tool assembly is rotated 180° from that shown in FIG. 1. By manipulating the first handle 84, the second screw member 52 forces the pin 12 inwardly of the bucket tooth 16 and into engagement with the spring element 27.

Other aspects, objects and advantages of this invention can be obtained from a study of the drawings, the disclosure, and the appended claims.

I claim:

1. A tool assembly for installing and removing a replaceable retaining pin in a joint between a plurality of elements, said tool assembly comprising:

- a first lever member having first and second spaced apart walls and a connecting plate, each of said walls having first and second end portions and an intermediate portion, said connecting plate being connected to said walls to maintain a predetermined space therebetween;
- a second lever member having first and second end portions and an intermediate portion, said first end portion being positioned within said space and pivotably connected to the intermediate portions of said first and second walls;
- a first screw member having a threaded portion threadably connected to said first lever member at said first end portions of said first and second walls;
- a second screw member having a threaded portion threadably connected to said second end portion of said second lever member; and
- a handle connected to said connecting plate.

2. A tool assembly, as set forth in claim 1, wherein said intermediate portion of said second lever member defines a socket and said first screw member has a first end portion pivotably positioned within said socket.

3. A tool assembly, as set forth in claim 2, wherein said intermediate portion of said second lever member defines first and second bores extending through said second lever member and intersecting said socket, and first and second pins positioned in respective first and second bores.

4. A tool assembly, as set forth in claim 2, wherein said socket is positioned substantially perpendicular to said second screw member.

5. A tool assembly, as set forth in claim 1, including a spacer positioned within said space and connected to the first and second walls of said first lever member at said first end portions.

6. A tool assembly, as set forth in claim 5, wherein said spacer has a first threaded throughbore and said first screw member is threadably engaged with said first threaded throughbore.

7. A tool assembly, as set forth in claim 1, wherein said second end portion of said second lever member defines a second threaded throughbore and said second screw member is threadably engaged with said second threaded throughbore.

8. A tool assembly, as set forth in claim 1, wherein said first screw member has a second end portion, and a first handle is connected to said second end portion.

9. A tool assembly, as set forth in claim 1, wherein said second screw member has first and second end portions and a second handle is connected to said second end portion, said first end portion being adapted to contact said retaining pin.

10. A tool assembly, as set forth in claim 1, including first and second positioning devices connected to a respective intermediate portion of said first and second walls.

11. A tool assembly, as set forth in claim 10, wherein each of said positioning devices includes a block having a threaded throughbore and a threaded rod engageable with said threaded throughbore.

12. A tool assembly for installing and removing a replaceable retaining pin in a joint between a plurality of elements, said tool assembly comprising:

- a first lever member having first and second spaced apart walls and a connecting plate, each of said walls having first and second end portions and an intermediate portion, said connecting plate being connected to said walls to maintain a predetermined space therebetween;
- a second lever member having first and second end portions and an intermediate portion, said first end portion being positioned within said space and pivotably connected to the intermediate portions of said first and second walls;
- a first screw member having a threaded portion threadably connected to said first lever member at said first end portions of said first and second walls;

a second screw member having a threaded portion threadably connected to said second end portion of said second lever member; and said intermediate portion of said second lever member defining a socket and first and second bores extending through said second lever member and intersecting said socket, and first and second pins positioned in respective first and second bores, and said first screw member having a first end portion pivotably positioned within said socket.

13. A tool assembly for installing and removing a replaceable retaining pin in a joint between a plurality of elements, said tool assembly comprising:

a first lever member having first and second spaced apart walls and a connecting plate, each of said walls having first and second end portions and an intermediate portion, said connecting plate being connected to said walls to maintain a predetermined space therebetween;

a second lever member having first and second end portions and an intermediate portion, said first end portion being positioned within said space and pivotably connected to the intermediate portions of said first and second walls;

a first screw member having a threaded portion threadably connected to said first lever member at said first end portions of said first and second walls;

a second screw member having a threaded portion threadably connected to said second end portion of said second lever member; and said intermediate portion of said second lever member defining a socket and said first screw member having a first end portion pivotably positioned within said socket, said socket being positioned substantially perpendicular to said second screw member.

* * * * *